Patented June 11, 1940

2,203,842

UNITED STATES PATENT OFFICE 2,203,842

PRODUCTION OF LOW BOILING MOTOR FUELS

Mathias Pier, Heidelberg, Germany, assignor to I. G. Farbenindustrie Aktiengesellschaft, Frankfort-on-the-Main, Germany No Drawing. Application August 24, 1937, Serial No. 160,598. In Germany September 5, 1936

3 Claims. (Cl. 196—10)

The present invention relates to the production of motor fuels of low boiling point.

I have found that liquid motor fuels having very good non-knocking properties and boiling within the boiling range of benzene can be prepared from gaseous hydrocarbons which are mainly of a saturated character by leading the latter or mixtures containing the same together with hydrogen under a high pressure of at least 100 atmospheres at temperatures above 450° C. over catalysts having a strongly hydrogenating or an acid and splitting action.

The hydrogen is used in such amounts that the partial pressure of the gaseous hydrocarbons in the initial gas amounts to at least 65 per cent, preferably 70 per cent or more, of the total pressure. The hydrogen partial pressure usually ranges between 5 and 30 per cent. The lower the molecular weight of the gaseous hydrocarbon or hydrocarbons used, and therefore the richer it is in hydrogen, the higher is the partial pressure selected for it. For example pentane is preferably used under a partial pressure of from 65 to 75 per cent of the total pressure, butane under a partial pressure of from 70 to 85 per cent, propane under a partial pressure of from 80 to 90 per cent and ethane under a partial pressure of from 90 up to nearly 100 per cent.

As initial gases there may be mentioned in particular propane, butanes and pentanes or mixtures of the same, as for example waste gases containing the said hydrocarbons derived from destructive hydrogenation of carbonaceous materials.

The total pressure is usually between 100 and 600 atmospheres, but even higher pressures may be used; it is preferable to work at pressures between 250 and 500 atmospheres.

The reaction may be carried out at temperatures between 450° and 700° C. and temperatures between 500° and 600° C. are advantageous. Higher temperatures are employed in the treatment of hydrocarbons of low molecular weight, such as propane and ethane, than in the treatment of hydrocarbons of higher molecular weight, such as butane and pentane.

As suitable catalysts there come into consideration those which have a strong hydrogenating action or those which have at the same time an acid and a splitting action. By substances having an acid action I mean those which under the conditions of working are capable of acting as an acid; by substances having a splitting action I mean those which are capable of promoting the splitting off of hydrogen or the splitting of carbon bonds at an elevated temperature. As examples of catalysts having a strong hydrogenating action I mention sulphides of magnesium or aluminium or of heavy metals, such as zinc, cadmium, titanium, tin and the metals of the iron group, and in particular the sulphides of metals from groups 5 and 6 of the periodic system, further the metals of these groups themselves, such as molybdenum or tungsten, or their compounds other than the aforesaid sulphides, such as their oxides, phosphates or halides, if desired together with other metals, as for example in the form of nickel tungstate. Examples of catalysts having an acid and a splitting action are metals or their compounds (such as their oxides, hydroxides, halides, sulphides, phosphates) together with halogens, hydrogen halides or halides of in particular solid metalloids, or the latter halides alone, or metal compounds (such as their oxides, hydroxides, halides, sulphides, phosphates) together with phosphoric acid. All the said catalysts are preferably employed on carriers, as for example active carbons, bentonite, Florida earths, bleaching earths or bauxite. Of particular advantage are mixtures of aluminium hydroxide, ammonium molybdate and the substance known under the trade-mark "Norit" (an active carbon), or vanadium and tungsten (as oxides or sulphides), or zinc magnesium molybdate (also in sulphurized form), or copper or zinc silicate with tungsten sulphide or molybdenum sulphide, or a thoroughly sulphurized mixture of the elements tin, boron and tungsten (by sulphurizing I mean treating with sulphur or hydrogen sulphide or another gaseous or vaporous compound containing sulphur in the divalent state in such a manner that a substantial conversion into sulphides takes place.

Since hydrogen is used up during the reaction, care should be taken that hydrogen is still present after the reaction. Generally speaking the hydrogen dissolved in the compressed and not yet heated liquefied gaseous hydrocarbon at 200 atmospheres or more is sufficient for the reaction. The amount of hydrogen depends on the desired degree of reaction. It is advantageous to select the reaction conditions so that only part of the initial material is reacted. The reaction product, while still under the prevailing pressure or after partly releasing the pressure, as for example to from 20 to 50 atmospheres or down to 5 atmospheres, is fractionally split up into liquid products of the desired boiling ranges and into initial material which has not been reacted or which has reacted to form the corresponding gaseous olefines (as for example into gas containing butane, propane, butylenes and propylene and in some cases also ethane and ethylene), which are returned, and into gases which cannot be reacted or cannot readily be reacted, as for example the residual hydrogen with methane and ethane, and into the impurities, as for example nitrogen, contained in the gases. The reaction conditions, i. e temperature, pressure, throughput, partial pressures and catalyst, are usually so selected that from about 10 to 60 per cent, in particular from 20 to 40 per cent, of the hydrocarbons are reacted.

The total pressure and time during which the initial hydrocarbon or hydrocarbons are subjected to the reaction are preferably the greater, the lower the molecular weight of the initial hydrocarbon or hydrocarbons.

The following example will further illustrate the nature of this invention but the invention is not restricted to this example.

Example

A mixture of 80 per cent of butane and 20 per cent of hydrogen is led under a pressure of 300 atmospheres and at a temperature of 530° C. over a tungsten-nickel sulphide catalyst, the throughput being 2 kilograms of butane per hour per liter of catalyst. In this way 38 per cent of the butane are reacted. The remaining 62 per cent of butane together with the propane formed and a part of the ethane are returned. From the butane reacted there are formed about 58 per cent of liquid products which consist to the extent of 80 per cent of an excellent benzine having an octane value of 82. The remaining 20 per cent constitute a middle oil. In addition to the liquid product, the main product from the reacted butane is methane. The benzine needs no refining.

What I claim is:

1. A process for the production of motor fuels of low boiling point which comprises passing a gas comprising essentially at least one saturated hydrocarbon, selected from the group consisting of propane, butane and pentanes, together with hydrogen under a high total pressure and a high partial pressure of the said saturated hydrocarbon of at least 65 per cent of the total pressure and at a temperature between 450 and 700° C. over a catalyst selected from the group consisting of catalysts having a strong hydrogenating action and those having an acid and a splitting action.

2. In the process as claimed in claim 1, working at a temperature between 500° and 600° C.

3. In the process as claimed in claim 1, working under a pressure between 100 and 600 atmospheres.

MATHIAS PIER.